United States Patent [19]

Robello et al.

[11] Patent Number: 4,900,127

[45] Date of Patent: Feb. 13, 1990

[54] OPTICAL ARTICLE CONTAINING A LINEAR POLYMER EXHIBITING A HIGH LEVEL OF SECOND ORDER POLYMERIZATION SUSCEPTIBILITY

[75] Inventors: Douglas R. Robello, Webster; Abraham Ulman; Craig S. Willand, both of Rochester, all of N.Y.

[73] Assignee: Eastman Kodak Company, Rochester, N.Y.

[21] Appl. No.: 241,740

[22] Filed: Sep. 8, 1988

Related U.S. Application Data

[63] Continuation-in-part of Ser. No. 101,884, Sep. 28, 1987, abandoned, and a continuation-in-part of Ser. No. 101,888, Sep. 28, 1987, Pat. No. 4,720,208.

[51] Int. Cl.⁴ .......................... G02B 6/00; G02F 1/03; C08G 63/62
[52] U.S. Cl. .................. 350/96.34; 528/373; 350/356
[58] Field of Search .................. 307/425–430; 350/96.34, 96.30, 354, 356, 353; 430/321, 285; 528/373

[56] References Cited

U.S. PATENT DOCUMENTS

| | | | |
|---|---|---|---|
| 4,431,263 | 2/1984 | Garito | 350/96.34 |
| 4,485,161 | 11/1984 | Scozzafava et al. | 430/60 |
| 4,515,429 | 5/1985 | Smith et al. | 350/96.34 |
| 4,536,450 | 8/1985 | Garito | 350/96.34 |
| 4,605,869 | 8/1986 | Choe | 307/425 |
| 4,607,095 | 8/1986 | Kuder | 350/356 |
| 4,655,554 | 4/1987 | Armitage | 350/356 |
| 4,659,177 | 4/1987 | Choe et al. | 350/96.34 |
| 4,694,048 | 9/1987 | Choe | 350/356 |
| 4,694,066 | 9/1987 | DeMartino et al. | 528/373 |
| 4,707,303 | 11/1987 | Buckley et al. | 350/353 |
| 4,711,532 | 12/1987 | Choe, II | 350/356 |
| 4,717,508 | 1/1988 | DeMartino | 307/425 |
| 4,719,281 | 1/1988 | Choe | 307/425 |
| 4,720,355 | 1/1988 | DeMartino | 307/425 |
| 4,766,171 | 8/1988 | DeMartino | 307/425 |
| 4,767,169 | 8/1988 | Teng et al. | 307/430 |
| 4,779,961 | 10/1988 | DeMartino | 307/425 |
| 4,783,151 | 11/1988 | Choe | 307/425 |
| 4,792,208 | 12/1988 | Ulman et al. | 350/96.34 |
| 4,796,971 | 1/1989 | Robello et al. | 350/96.34 |
| 4,801,670 | 1/1989 | DeMartino et al. | 350/96.34 |

OTHER PUBLICATIONS

Matsumoto et al., "Nonlinear Optical Properties of an Azo Dye Attached Polymer", App. Phys. Lett., vol. 51, No. 1, July 1987, pp. 1 and 2.

D. J. Williams, "Organic Polymeric and Non-Polymeric Materials with Large Optical Nonlinearities", Angew. Chem. Int. Ed. Engl. 23 (1984), 690–703.

Zyss, "Nonlinear Organic Materials for Integrated Optics", Journal of Molecular Electronics, vol. 1, pp. 25–45, 1985.

Girling et al., "Observation of Second Harmonic Generation from a Langmuir-Blodgett Monolayer of a Merocyanine Dye", Electronics Letters, vol. 21, No. 5, 2/28/85.

(List continued on next page.)

Primary Examiner—Frank Gonzalez
Attorney, Agent, or Firm—Carl O. Thomas

[57] ABSTRACT

An optical article is disclosed containing, for the transmission of electromagnetic radiation, a medium exhibiting a second order polarization susceptibility greater than $10^{-9}$ electrostatic units comprised of a linear polymer containing as pendant groups polar aligned noncentrosymmetric molecular dipoles having an electron donor moiety linked through a conjugated $\pi$ bonding system to an electron acceptor moiety to permit oscillation of the molecular dipole between a ground state exhibiting a first dipole moment and an excited state exhibiting a differing dipole moment. The linear polymer contains repeating units derived from vinyl addition polymerization, at least 5 percent of the repeating units incorporate the molecular dipoles as pendant groups, and the molecular dipoles include a sulfonyl electron acceptor moiety.

20 Claims, 2 Drawing Sheets

OTHER PUBLICATIONS

Neal et al., "Second Harmonic Generation from LB Superlattices Containing two Active Compounds", *Electronics Letters*, vol. 22, No. 9, 4/24/86.

Singer et al., "Second Harmonic Generation in Poled Polymer Films", *Appl. Phys. Lett.*, vol. 49, No. 5, 8/4/86, pp. 248–250.

Le Barny et al., "Some New Side-Chain Liquid Crystalline Polymers for Non-Linear Optics", SPIE, vol. 682, Molecular and Polymeric Optoelectronic Materials: Fundamentals and Applications (1986) pp. 56–64.

Griffin et al., "Synthesis of Sidechain Liquid Crystal Polymers for Nonlinear Optics", SPIE, vol. 682, Molecular and Polymeric Optoelectronic Materials: Fundamentals and Applications (1986) pp. 65–69.

Chemla et al., "Nonlinear Optical Properties of Organic Molecules and Crystals", vol. 1, pp. 280–282.

Rheinhardt et al., "The Crystal Structure of Sulfisomidine", *Current Science*, vol. 49, p. 586, 1980.

OPTICAL ARTICLE CONTAINING A LINEAR POLYMER EXHIBITING A HIGH LEVEL OF SECOND ORDER POLYMERIZATION SUSCEPTIBILITY

This is a continuation-in-part of U.S. application Ser. No. 101,884, filed Sept. 28, 1987, and now abandoned and U.S. Ser. No. 101,888, filed Sept. 28, 1987, which issued as U.S. Pat. No. 4,720,208, Dec. 20, 1988.

FIELD OF THE INVENTION

The invention relates to optical articles, particularly articles which exhibit effects attributable to the polarization of electromagnetic radiation. The invention relates specifically to optical articles which exhibit effects attributable to the nonlinear polarization of electromagnetic radiation.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed by Equation 1:

$$P = \alpha E + \beta E^2 + \gamma E^3 \tag{1}$$

where
P is the total induced polarization,
E is the local electric field created by electromagnetic radiation, and
$\alpha$, $\beta$, and $\gamma$ are the first, second, and third order polarizabilities, each of which is a function of molecular properties.

$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \tag{2}$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium.

$\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi E$, second order or first nonlinear polarization $\chi^{(2)} E^2$, and third order or second nonlinear polarization $\chi^{(3)} E^3$.

Second order polarization ($\chi^{(2)} E^2$) has been suggested to be useful for a variety of purposes, including optical rectification (converting electromagnetic radiation input into a DC output), generating an electro-optical (Pockels) effect (using combined electromagnetic radiation and DC inputs to alter during their application the refractive index of the medium), phase alteration of electromagnetic radiation, and parametric effects, most notably frequency doubling, also referred to as second harmonic generation (SHG).

To achieve on a macromolecular level second order polarization ($\chi^{(2)} E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu. For a molecule to exhibit values of $\beta$ greater than zero, it is necessary that the molecule be asymmetrical about its center—that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular dipoles are allowed to align themselves in an electric field.

D. J. Williams, "Organic Polymeric and Non-Polymeric Materials with Large Optical Nonlinearities", *Angew. Chem.* Int. Ed. Engl. 23 (1984) 690–703, postulates mathematically and experimentally corroborates achievement of second order polarization susceptibilities $\chi^{(2)}$ using organic molecular dipoles equalling and exceeding those of conventional inorganic noncentrosymmetric dipole crystals, such a lithium niobate and potassium dihydrogen phosphate. To obtain the polar alignment of the organic molecular dipoles necessary to large values of $\chi^{(2)}$ Williams dispersed small amounts of the organic molecular dipoles as guest molecules in host liquid crystalline polymers. Upon heating the host polymers above their glass transition temperatures, poling in an externally applied electric field to produce the desired polar alignment of the molecular dipoles, and then cooling with the field applied, organic films with the measured levels of $\chi^{(2)}$ were obtained.

Zyss "Nonlinear Organic Materials for Integrated Optics", *Journal of Molecular Electronics*, Vol. 1, pp. 25–45, 1985, though generally cumulative with Williams, provides a review of passive linear light guide construction techniques and elaborates on LB film construction techniques including radiation patterning, showing in FIG. 8 an LB film construction converted into a linear polymer.

Recently attempts have been reported to prepare linear polymers containing pendant groups capable of acting as molecular dipoles for enhancing second order polarization effects. These attempts are illustrated by the following papers, all published in SPIE, Vol. 682, Molecular and Polymeric Optoelectronic Materials: Fudamentals and Applications (1986):

Le Barny, Ravaux, Dubois, Parneix, Njeumo, Legarnd, and Levelut, "Some New Side-Chain Liquid Crystalline Polymers for Non-Linear Optics", pp. 56–64, discloses unsuccessful attempts to obtain liquid crystal properties in vinyl addition copolymers containing aminostilbene pendant groups in concentrations of 2.6 percent.

Griffin, Bhatti, and Hung, "Synthesis of Sidechain Liquid Crystal Polymers for Nonlinear Optics", pp.

65-69, reports polyester copolymers containing stilbene molecular dipoles linked to the polymer backbone through an oxy electron donating moiety.

DeMartino et al U.S. Pat. No. 4,694,066 discloses a thermotropic liquid crystalline polymer which is characterized by a recurring monomeric unit of the formula:

where
P is a polymer main chain unit,
S is a flexible spacer, and
M is a pendant mesogen which exhibits a second order nonlinear optical susceptibility $\beta$ of at least about $20 \times 10^{-30}$ esu under stated conditions of measurement. In one form the mesogen satisfies the formula:

where
X is —NR—or —S—;
Y can take various stilbenoid forms; and
Z is an electron donating or withdrawing group,
the latter including nitro, haloalkyl, acyl, alkanoyloxy, alkoxysulfonyl, and the like.

S. Matsumoto, K. Kubodera, T. Kurihara, and T. Kaino, "Nonlinear Optical Properties of an Azo Dye Attached Polymer", App. Phys. Lett., Vol. 51, No. 6, Jul. 1987, pp. 1 and 2, discloses the synthesis of copolymers of azo dye disubstituted acrylic monomer and methyl methacrylate.

RELATED PATENT APPLICATIONS

Optical articles containing polar aligned organic molecular dipoles which form repeating units in a crosslinked polymeric matrix are the subject matter of Robello et al, "AN OPTICAL ARTICLE CONTAINING A POLYMERIC MATRIX EXHIBITING A HIGH LEVEL OF SECOND ORDER POLARIZATION SUSCEPTIBILITY", Ser. No. 101,886, filed Sept. 28, 1987, commonly assigned, issued as U.S. Pat. No. 4,796,971, Jan. 10, 1989.

Optical articles containing molecular dipoles held in polar alignment by a crosslinked polymeric binder are the subject matter of Scozzafava et al, "AN OPTICAL ARTICLE CONTAINING A TRANSMISSION MEDIUM EXHIBITING A HIGH LEVEL OF SECOND ORDER POLARIZATION SUSCEPTIBILITY", Ser. No. 101,897, filed Sept. 28, 1987, commonly assigned, allowed Mar. 17, 1989.

SUMMARY OF THE INVENTION

In one aspect, this invention is directed to an optical article containing, for the transmission of electromagnetic radiation, a medium exhibiting a second order polarization susceptibility greater than $10^{-9}$ electrostatic units comprised of a linear polymer containing as pendant groups polar aligned noncentrosymmetric molecular dipoles having an electron donor moiety linked through a conjugated $\pi$ bonding system to an electron acceptor moiety to permit oscillation of the molecular dipole between a ground state exhibiting a first dipole moment and an excited state exhibiting a differing dipole moment.

The optical article is characterized in that the linear polymer contains repeating units derived from vinyl addition polymerization, at least 5 percent of the repeating units incorporate the molecular dipoles as pendant groups, and the molecular dipoles include a sulfonyl electron acceptor moiety.

Optical articles comprised of linear polymers having pendant molecular dipoles satisfying the above requirements offer distinct advantages over the prior state of the art. First, the formation of linear polymers with molecular dipoles as pendant groups avoids a variety of problems (e.g., limited solubilities and phase separation) that arise from attempts to disperse or dissolve molecular dipoles in separate polymeric binders.

Second, substitution of sulfonyl as an electron acceptor moiety for electron acceptor moieties previously known to the art offers a variety of advantages. For example, none of the efficient electron acceptor moieties, such as cyano or nitro moieties, can be chemically substituted without destroying their essential electronic properties. On the other hand, the sulfonyl moiety of the invention requires by definition a hydrocarbon substituent, which can be further substituted, if desired. Thus, the sulfonyl electron acceptor moiety offers much greater synthetic freedom for controlling the physical properties of the molecular dipole for optimum utilization. The substitution of sulfonyl electron acceptor moieties for conventional electron acceptor moieties can extend optical utility to different wavelength regions of the spectrum by being more transparent to input electromagnetic radiation, output radiation—e.g., second harmonic radiation, or a combination of both. The sulfonyl containing dipoles offer a broader range of solvent and binder compatibilities for achieving the required polar alignments for useful effects produced by second order polarization in optical articles. Sulfonyl substitution to achieve optimized physical compatibility with other materials encountered in optical article fabrication is readily achieved. By emplying a sulfonyl electron acceptor group in combination with a hydrocarbon substituted electron donor group it is apparent that both ends of the dipolar molecule can be optimized for the construction of polar aligned molecular dipoles.

DESCRIPTION OF PREFERRED EMBODIMENTS

Figure 1:
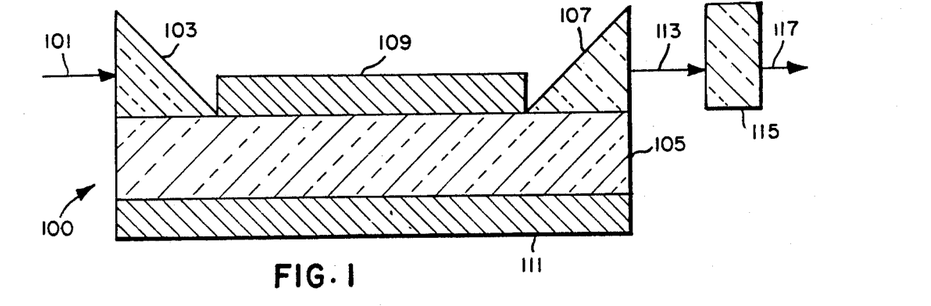
FIG. 1 is a second harmonic generating optical article.

The following are illustrative of optical articles satisfying the invention exhibiting effects attributable to second order polarization:

Referring to FIG. 1, the optical article 100 is capable of generating a second harmonic of electromagnetic radiation 101 supplied to it. Incoming electromagnetic radiation is introduced through input means 103, shown as a first prism, into an optically active transmission medium 105 which exhibits a high level ($>10^{-9}$ esu) second order or first nonlinear polarization susceptibility, hereinafter referred to simply as the optically active transmission medium according to the invention or, more succinctly, as the optically active transmission medium. Electromagnetic radiation is transmitted through the medium 105 to output means 107, shown as a second prism. In the simplest form of the optical article neither the input nor output prisms are required. Escape of electromagnetic radiation from the transmission medium can be minimized by locating optional guiding elements 109 and 111 above and below the transmission medium. The guiding elements can minimize radiation loss by being chosen to exhibit a lower refractive index than the transmission medium. Additionally or alternatively, the guiding elements can be chosen to be reflective to the electromagnetic radiation.

When the transmission medium is constructed according to the requirements of the invention, specifically described below, at least a portion of the electromagnetic radiation entering the transmission medium will be altered in frequency during its travel through the medium. More specifically, a second harmonic of the frequency will be generated. The electromagnetic radiation leaving the output means, indicated by arrow 113, exhibits both the original frequency of the input radiation and a second harmonic of this frequency. The electromagnetic radiation retaining the original frequency can, if desired, be removed by passing the electromagnetic radiation leaving the article through a filter 115 capable of absorbing radiation of the original frequency while transmitting higher frequency (shorter wavelength) portions of the electromagnetic radiation. By employing one or a combination of filters any broad or narrow frequency band of electromagnetic radiation can be retained in the transmitted output electromagnetic radiation 117.

Figure 2:
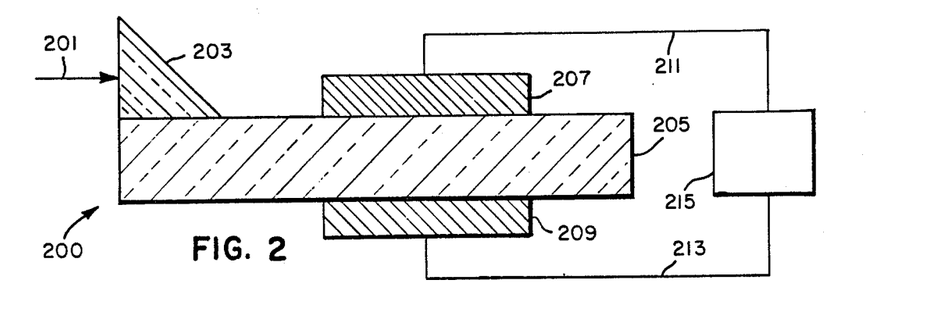
FIG. 2 is a DC signal providing optical article.

Referring to FIG. 2, an optical article 200 is shown capable of producing a DC potential when electromagnetic radiation 201 is supplied through input means 203, shown as a prism, to optically active transmission medium 205, which can be identical to medium 105, described above. When electromagnetic radiation is being transmitted through the medium a potential difference is produced between upper electrode 207 and lower electrode 209 in electrical contact with the upper and lower surfaces of the transmission medium. Electrical conductors 211 and 213 can be used to relay the potential of the upper and lower electrodes to an electronic response unit 215. The electronic response unit can in its simplest form be a unit that provides a digital response indicative of the presence or absence of electromagnetic radiation in the transmission medium. Alternatively, the electronic response unit can provide an analog response indicative not only of the presence, but also the intensity or wavelength of electromagnetic radiation in the transmission medium.

Figure 3:
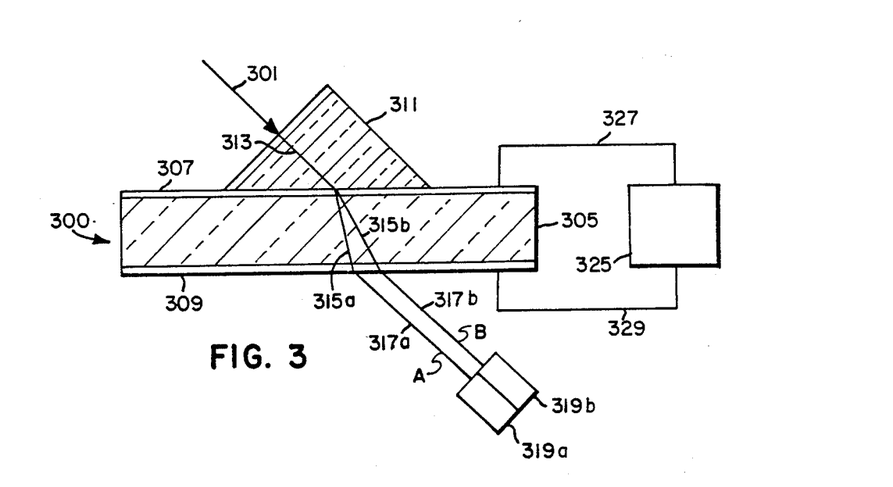
FIG. 3 is an electromagnetic beam displacement optical article.

Referring to FIG. 3, the optical article 300 is capable of physically displacing a beam 301 of electromagnetic radiation being transmitted through it as a function of the concurrent receipt of a DC bias. Optically active transmission medium 305, which can be identical to optically active medium 105 or 205, is provided with transparent upper and lower electrodes 307 and 309. The electrodes can, for example, be thin layers of a vacuum vapor deposited metal or metal oxide—e.g., indium tin oxide. An electromagnetic radiation input means, shown as prism 311, is located on the upper transparent electrode. The electromagnetic radiation passes through the prism as indicated by arrow 313. When the electromagnetic radiation enters the transmission medium, it follows either path 315a or path 315b. Depending upon which of the two alternative paths are followed, the first electromagnetic radiation either travels along path 317a or 317b upon emerging from the lower transparent electrode. The paths 315a and 317a together constitute an A path through the optical article while the paths 315b and 317b together constitute a B path through the optical article. Sensing units 319a and 319b are located to receive electromagnetic radiation traveling along the A and B paths, respectively. It is apparent that only one of the two sensing units is essential, since failure to sense electromagnetic radiation can be employed to indicate that the electromagnetic radiation has shifted to the alternate path.

Shifting of electromagnetic radiation between the A and B paths is achieved by supplying a DC bias to the upper and lower electrodes while transmission of the electromagnetic radiation through the optically active transmission medium is occurring. To accomplish the required DC bias a DC potential source 325 is shown connected to the upper and lower electrodes by electrical conductors 327 and 329.

Application of the DC bias alters the refractive index of the transmission medium when it is formed of a material exhibiting a significant second order susceptibility. This causes the first electromagnetic radiation beam to be refracted at a different angle when the transmission medium is electrically biased, and this changes the first electromagnetic radiation path through the transmission medium. In some instances the refractive index of the transmission medium is increased by the electrical bias and in other instances lowered by the electrical bias, depending upon whether the molecular dipole contained within the transmission medium exhibits a positive or negative first hyperpolarizability $\beta$.

Figures 4, 6:
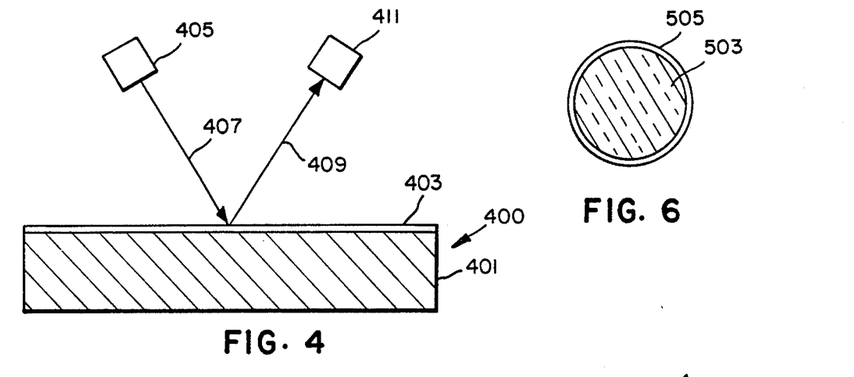
FIG. 4 is an alternative form of a second harmonic generating optical artical.
FIG. 6 is a section taken along section line 6—6 in FIG. 5.

In FIG. 4 an optical article 400 is shown comprised of a reflective substrate 401 and an optically active transmission medium 403 according to the invention shown in the form of a layer. Electromagnetic radiation is supplied from a source 405 as indicated by arrow 407. The electromagnetic radiation traverses the optically active transmission medium, is reflected by the substrate, and traverses the optically active transmission medium a second time. Electromagnetic radiation leaving the optically active transmission medium is indicated by arrow 409. A sensor 411 which is responsive to the second harmonic of the input electromagnetic radiation, but not radiation at the wavelength of the input radiation, is shown provided to receive electromagnetic radiation from the layer 403. Instead of employing a sensor that is selectively responsive to the second harmonic wavelength, a sensor with a broader frequency band of response can be employed in combination with one or more filter elements, as described above in connection with FIG. 1. The thinner the layer of the optically active transmission medium, the higher the intensity of the input electromagnetic radiation must be in order to achieve a given output of second harmonic radiation. In the limiting case the optically active transmission medium can be a monomolecular oriented molecular dipole layer.

Figure 5:
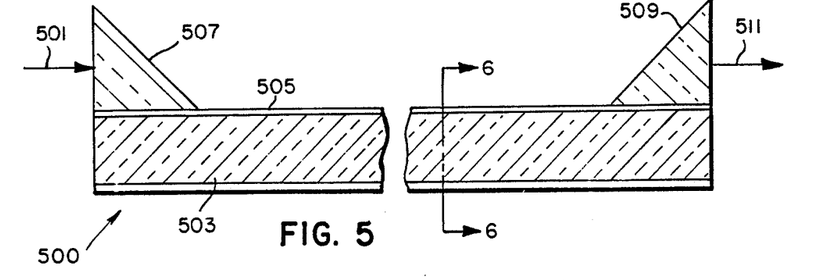
FIG. 5 is an optical article for achieving parametric effects.

In FIGS. 5 and 6 an optical article 500 according to the invention is shown capable of inducing parametric effects, such as second harmonic generation, by acting on input electromagnetic radiation, indicated by arrow 501. To achieve alteration of the input radiation a transparent optical waveguide 503 of any conventional type is provided having on its external surface a layer of an optically active transmission medium 505 according to the invention, which can have the same properties as the medium 105, described above. The optical waveguide 503 is normally optically passive—that is, exhibits no significant levels of nonlinear (second or third order) polarization.

Means 507, shown as a prism, is provided to introduce the input electromagnetic radiation into the waveguide. Means 509, shown as a prism, is provided to retrieve electromagnetic radiation from the waveguide. Although the optically active transmission medium is shown interposed between the input and output prisms, it is appreciated that an interposed layer is not required in these locations.

As the input electromagnetic radiation traverses the waveguide, a portion of the radiation will impinge on the surrounding layer of the optically active transmission medium and be refracted back into the waveguide. To avoid escape of electromagnetic radiation a reflective layer, not shown, can be coated over the optically active transmission medium. Successive impingements of transmitted radiation on the optically active medium result in measureable parametric effects, such as second harmonic generation.

Figure 7:
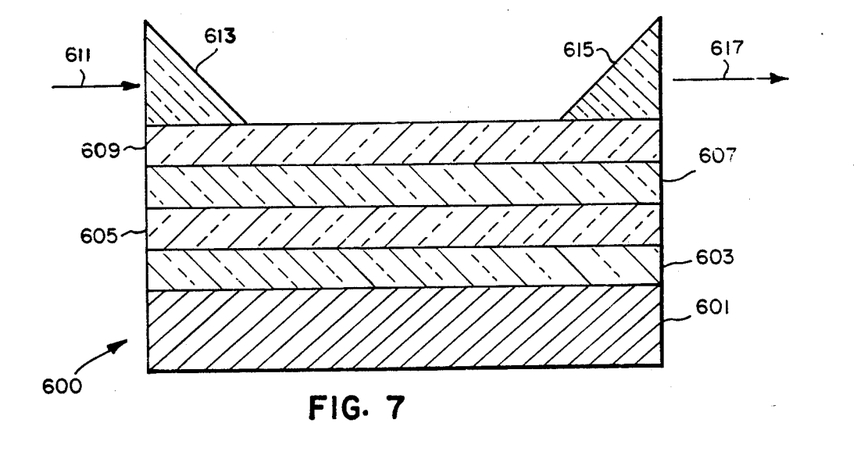
FIG. 7 is an optical article for achieving parametric effects and phase shifting.

In FIG. 7 an optical article 600 is shown capable of producing useful parametric effects similarly as optical article 500, but exhibiting a greater capability for better phase matching, such as that desired for improved efficiency second harmonic generation. A substrate 601 is shown supporting superimposed waveguide layers 603, 605, 607, and 609. While four superimposed layers are shown, in practice any odd or even number of superimposed layers can be provided. The odd layers (603 and 607) in the sequence can be formed of an optically active transmission medium according to the invention (similarly as medium 105) while the even layers (605 and 609) can be formed of a passive or linear optical medium, as described above. Alternatively, the optically active and passive transmission media layers can be reversed in order.

To achieve useful parametric effects, electromagnetic radiation, indicated by arrow 611 is supplied to the waveguiding layers through input means 613, shown as a prism. In passing through the waveguiding layers to output means 615, shown as a prism, the optically active and passive media layers together alter the form of the electromagnetic radiation, indicated by output arrow 617, so that parametric (e.g., second harmonic) effects are more efficiently generated.

The optical article constructions described above are exemplary of a large variety of possible differing optical article constructions. The present invention is compatible with any conventional construction of an optical article relying on a significant second order polarization susceptibility to produce a useful effect. For example, whereas in connection with FIG. 5 an optical article is disclosed in which the optically active transmission medium surrounds a substrate, which can have linear optical properties, Zyss, cited above, in FIG. 2(d) discloses just the converse arrangement, in which the optically active transmission medium forms a core clad with a shell of a linear optical transmission medium. Zyss also discloses an arrangement in which the optically active transmission medium is located in a groove on the surface of a linear optical transmission substrate. All of the optical article constructions of Zyss exhibiting second order nonpolarization effects can be applied to the practice of this invention and are here incorporated by reference.

An essential component of each of the optical articles of this invention is an optically active transmission medium comprised of a linear vinyl addition polymer which exhibits a second order polarization susceptibility $\chi^{(2)}$ greater than $10^{-9}$ (preferably greater than $10^{-8}$) electrostatic units. This high level of $\chi^{(2)}$ is achieved by choosing at least 5 percent of the repeating units of the polymer to contain as a pendant group a molecular dipole exhibiting a high level of first hyperpolarizability $\beta$. For succinctness, these molecular dipoles are hereinafter referred to as high $\beta$ molecular dipoles and the repeating units in which they are incorporated are referred to as high $\beta$ repeating units. When the high $\beta$ repeating units constitute at least 5 percent of the total repeating units of the linear polymer, they usually constitute about 20 percent, on a weight basis, of the linear polymer, since they generally exhibit a relatively higher molecular weight than the remaining repeating units, if any, of the linear polymer.

The molecular dipole pendant groups of the repeating units include a sulfonyl electron acceptor moiety. In a preferred form the repeating units containing pendant molecular dipoles can be represented by Formula 3:

(3)

where

L is a divalent flexible spacer moiety;

MD is a high $\beta$ molecular dipole containing a sulfonyl electron acceptor; and

$R^1$ is hydrogen, halogen, or alkyl of from 1 to 6 carbon atoms.

It is apparent that when $R^1$ is hydrogen or methyl the repeating unit is derived from an acrylate or methacrylate ester, respectively. These are the most common alkenoic acid esters employed in vinyl addition polymerization, but a variety of variants are known and can be employed alternatively, if desired. The acrylate and methacrylate esters are advantageous in offering the least molecular bulk.

To allow the molecular dipole freedom of spatial orientation with respect to the polymer backbone, as is required for efficient poling, a divalent flexible spacer L is interposed between the polymer backbone and the molecular dipole. A generally preferred flexible spacer is an alkylene group containing from 1 to 12 carbon atoms. In a variant form one or several nonadjacent carbon atoms can be replaced by oxygen, so that the linkage becomes an alkylene oxide linkage—e.g. an ethylene oxide linkage. Such a flexible spacer moiety can be readily provided by esterifying with the alkenoic acid a molecular dipole which contains a terminally hydroxy substituted alkyl or alkylene oxide substituent.

The high β molecular dipole MD along with the flexible spacer moiety L can be generally represented by Formula Pair 4:

(4)

where
A is a sulfonyl electron acceptor moiety;
D is an electron donor moiety;
E is a linking moiety, specifically a conjugated π bonding system consisting of two terminal carbocyclic aromatic rings linked through 1 to 3 vinyl groups; and
L is a flexible spacer moiety.

The molecular dipoles are represented by the oscillation (resonance) ground state and excited state extremes, since these lend themselves to representation by chemical formulae. Formula pairs are useful in bracketing the range of structural variance, even though it is recognized that in practice neither of the oscillation extremes may be actually fully realized. As is customary because of the simpler chemical nomenclature, the molecular dipoles and their moieties are named by their ground state structures.

The electron acceptor moiety A is a sulfonyl moiety. It can be represented by Formula Pair 5:

(5)

where R is L or an optionally substituted hydrocarbon moiety.

The electron donor moieties can take any convenient conventional form. The electron donor moiety can be an amino moiety. Primary, secondary, and tertiary amino moieties are contemplated for use, with the latter being most preferred and the former being least preferred. Only the secondary and tertiary amino moieties allow for substituent modification of properties through optional substitution of a hydrocarbon moiety similarly as the sulfonyl moiety, and only the tertiary amino moiety produces the most highly polar excited state. When the electron donor moiety, it can be represented by Formula Pair 6.

(6)

where $R^2$ and $R^3$ are independently L, hydrogen, or optionally substituted hydrocarbon moieties.

Instead of employing an amino group as an electron donor moiety, it is specifically contemplated to employ an oxy or thio electron donor moiety. When resonance path be defined by an even number of atoms. The number of atoms in the resonance path between the electron donor and acceptor is preferably at least 4 and optimally at least 8.

While increasing the number of atoms in the resonance path should increase the excited state dipole moment, it also tends toward nonplanar molecular conformations which lead to losses in hyperpolarizability density, defined above, as well as thermal and other energy losses (e.g., losses in transparency), so that at first diminishing gains and then overall losses result from increasing the number of atoms in the resonance path. It is generally preferred that the number of atoms in the resonance path between the electron donor and acceptor be 20 or less and optimally 14 or less.

In a preferred form the linking moieties can be represented by Formula Pair 8.

(8)

where
G is independently in each occurrence methine or aza and
m is 4 to 20, preferably 8 to 14.

For synthetic convenience it is generally preferred that no more than two adjacent G groups be aza groups. Thus, both individual aza (—N=) and diazo (—N=N—) groups are contemplated to be present in the linking moiety.

While the aza groups permit no substitution, the methine groups can be substituted, if desired. Preferred linking moieties are those which have been at least partially rigidized by substituents bridging methine groups in the resonance path. Rigidization of the linking moiety reduces energy dissipation. In a specifically preferred form of bridging substitution of the methine groups in the resonance path, the linking moiety is wholly or, preferably, partially aromatized. Both carbocyclic and heterocyclic aromatization is specifically contemplated.

The sulfonyl electron acceptor moiety A and the adjacent terminal portion of the linking moiety E can be represented by Formula Pair 9.

(9)

where
A is an electron acceptor moiety and
$R^a$ represent hydrogen, substituents which together with the electron acceptor moiety collectively enhance the electron acceptance of the phenyl ring to which they are attached, or, optionally in one occurrence, L.

When the electron acceptor moiety is a sulfonyl moiety $SO_2R$ and the adjacent atom of the linking moiety is an aza (—N=) group, the sulfonyl and aza groups in combination form a sulfonimino group =N—$SO_2R$. In a specific preferred form of the invention the terminal sulfonimino group and an adjacent aromatized portion of the linking group can be represented by Formula Pair 10.

(10)

where $R^a$ and $R^1$ are as previously defined.

The electron donor moiety D and the adjacent terminal portion of the linking moiety E can be represented by Formula Pair 11.

(11)

where
D is an electron donor moiety and
$R^d$ represent hydrogen, substituents which together with the electron donor D collectively enhance the electron donation of the phenyl ring to which they are attached, optionally including substituents, such as hydrocarbon substituents, or in one occurrence L.

When electron donation is from a nitrogen atom, a terminal aromatic rigidizing ring system formed by a 4-pyridinium and 4-pyrido tautomer is possible, as illustrated by the preferred dipolar compounds of Formula Pair 12.

(12)

where $R^d$ and $R^2$ are as previously defined.

In specifically preferred forms of the molecular dipoles the linking moiety is aromatized adjacent both the electron acceptor moiety, as indicated by Formulae 9 and 10, and the electron donor moiety, as indicated by Formulae 11 and 12.

A specifically preferred class of molecular dipoles satisfying the requirements of the invention are 4-A-4'-D-stilbenes, where A and D are as previously defined. In these stilbenes the electron acceptor and donor moieties are each bonded to one terminal aromatized portion of the conjugated π bonding linking moiety, with the aromatized portions of the linking moiety being joined by an ethylene (vinylene) group. When the single ethylene linking group of the stilbene is replaced by two or more ethylene groups, within the resonance path chain length limits noted above, highly advantageous analogues are realized. Substitution of individual methine groups with aza groups, particularly in the ethylenic portion of the linkage, are compatible with achieving high β values. The ethylenically expanded and aza substituted stilbene variants are hereinafter referred to as stilbenoid compounds, since they are compounds which share significant property similarities with stilbenes.

In a preferred form of the invention, the stilbenoid compounds can be presented by Formula Pair 13:

(13)

where
A, D, L, $R^a$, and $R^d$ are as previously defined;
G is independently in each occurrence a methine or aza group with the proviso that no more than two aza moieties are next adjacent; and
n is an integer of from 1 to 3.

A sulfonimino group is incompatible with the stilbenoid structures of Formula Pair 13. One preferred class of dipolar compounds exhibiting high levels of hyperpolarizability incorporating a terminal sulfonimino group are represented by Formula Pair 14.

(14)

where
D, L, R, $R^a$, and $R^d$ are as previously defined;
G is independently in each occurrence a methine or aza moiety, with the proviso that no more than two aza moieties are next adjacent; and
p is 0 or 1.

In Formula Pair 14 neither of the two terminal resonance path atoms of the linking moiety are included in a rigidizing aromatic ring, but the rigidizing aromatic ring or rings are located next adjacent to each resonance path terminal atom of the linking moiety. Note that either 6 or 12 atoms are present in the resonance path provided by the linking moiety.

When electron donation is from a nitrogen atom, a terminal aromatic rigidizing ring system formed by a 4-pyridinium and 4-pyrido tautomer is possible, as illustrated by the preferred dipolar compounds of Formula Pair 15.

(15)

where

L, $R^1$, $R^2$, $R^a$, and $R^d$ are as previously defined;

G is independently in each occurrence a methine or aza moiety, with the proviso that no more than two aza moieties are next adjacent; and q is an integer of from 0 to 3.

When the linking moiety contains two or more aromatic rings, it is specifically preferred that they be coplanar, since coplanarity achieves the highest hyperpolarizability densities. To preserve the coplanarity of the rings it is preferred that any intermediate methine groups which are not part of an aromatic ring remain unsubstituted. However, sterically compact methine substituents compatible with copolanarity, such as fluorine and lower alkyl groups of from about 1 to 3 carbon atoms, are contemplated.

Where the electron donor and/or electron acceptor moieties are relied upon for linking of the molecular dipoles to the polymer backbone, the aromatic rings of the linking moiety can be left unsubstituted while achieving high levels of performance. In other instances it may be synthetically convenient to employ the aromatic rings of the linking moiety as sites for linking the molecular dipoles to the polymer backbone. In either instance, it is appreciated that the dipole moment of a molecular dipole can be increased by employing in available phenylene ring positions substituents which supplement the electronic asymmetry induced by the electron acceptor A moiety and the electron donor moiety D. Electron donating and accepting properties of phenyl rings imparted by substitution have been extensively studied and quantified by the assignment of Hammett sigma values. Substituents which render phenyl rings electron accepting are assigned positive Hammett sigma values while negative Hammett sigma values are assigned to substituents which render phenyl rings electron donating. Hydrogen atoms attached to phenyl rings are assigned a Hammett sigma value of zero. By algebraically summing the Hammett sigma values of substituents to a phenyl ring it is possible to arrive at a net Hammett sigma value for the phenyl ring that is indicative of whether the substituted phenyl ring is electron accepting (indicated by a positive net Hammett sigma value) or electron donating (indicated by a negative net Hammett sigma value). Further, the algebraic sum of the substituent Hammett sigma values quantifies the degree to which the substituted phenyl ring is electron accepting or donating.

Lange's Handbook of Chemistry, 12 Ed., McGraw-Hill, 1979, Table 3-12, pp. 3-134 to 3-137, here incorporated by reference, lists Hammett sigma values for a large number of commonly encountered substituents. Ortho and para position substituents usually exhibit identical Hammett sigma values, which differ to only a limited degree from meta sigma values and can, in any event, be determined from published lists. Exemplary simple substituents and their published meta Hammett sigma values are primary and second alkyl substituents, such as methyl $\sigma=-0.07$, ethyl $\sigma=-0.07$, n-propyl $\sigma=-0.05$, i-propyl $\sigma=-0.07$, n-butyl $\sigma=-0.07$, and sec-butyl $\sigma=-0.07$. These alkyl substituents are synthetically convenient and therefore contemplated. Alkyl substituents containing tertiary carbon atoms and particularly tertiary alkyl groups tend to be even more highly electron donating. Aryl groups such as phenyl, α-naphthyl, and β-naphthyl groups are contemplated (e.g., phenyl $\sigma=+0.06$). Other useful and specifically contemplated hydrocarbon substituents include alkaryl substituents (e.g., p-methylphenyl), aralkyl substituents (e.g., benzyl $\sigma=-0.05$ and phenethyl), alkenyl substituents (e.g. vinyl $\sigma=+0.02$), aralkenyl substituents (e.g., 2-phenylvinyl $\sigma=+0.14$), alkynyl substituents (e.g., ethynyl $\sigma=+0.21$, propargyl, and 2-butynyl), and aralkynyl substituents (e.g., phenethynyl $\sigma=+0.14$). Substituted hydrocarbon substituents are also contemplated, such as haloalkyl substituents (e.g., bromomethyl, chloromethyl $\sigma=-0.12$, fluoromethyl, and iodomethyl), haloaryl substituents (e.g., p-bromophenyl, m-bromophenyl, and p-chlorophenyl, and hydroxyalkyl substituents (e.g., hydroxymethyl $\sigma=+0.08$).

It is specifically preferred to select $R^a$ substituents independently from among known phenyl ring substituents having a positive Hammett sigma value and to select $R^d$ substituents independently from among known phenyl ring substituents having a negative Hammett sigma value. However, it is recognized that combinations of $R^a$ substituents are possible, some of which are electron donating, some of which are essentially neutral, and some of which are electron accepting. Combinations of $R^a$ substituents are possible which, together with the electron acceptor moiety A, algebraically sum to a positive net Hammett sigma value. Preferably the combination of $R^a$ substituents, without inclusion of the sulfonyl group, provide a positive net Hammett sigma value. Similarly, any combination of $R^d$ substituents is possible which, together with the electron donor, D, algebraically sum to a negative net Hammett sigma value. Preferably the combination of $R^d$ substituents, without inclusion of the substituent D, provide a negative net Hammett sigma value.

To avoid perturbation of the desired resonance pattern no one $R^a$ substituent should have a Hammett sigma value more positive than that of the electron acceptor moiety, and no one $R^d$ substituent should have a Hammett sigma value more negative than that of the electron donor moiety D. It is also important to bear in mind that large $\beta$ values depend not only on achieving a large dipole moment, but also on achieving a large difference between the excited state and ground state dipole moments. Thus substituents must be chosen from among those which are compatible with reversible charge transfer—i.e., charge transfer resonance. Thus substituents of the very highest and lowest Hammett sigma values are preferably avoided.

It is recognized that two adjacent $R^a$ or $R^d$ substituents can, if desired, together form a ring fused with the phenyl ring to which they are attached. Fused benzo rings are specifically contemplated. Polycyclic aromatic rings, such as naphthyl and anthracyl aromatic rings, in the linking moieties are therefore possible. Fused benzo rings are compatible with the coplanarity of the aromatic nuclei and, unless they are themselves substituted, have little effect on electronic asymmetry. It is further recognized that $R^2$, $R^3$, and $R^4$ can, if desired, form with an $R^d$ substituent ortho to D a fused ring, preferably of 5 or 6 member ring. For example, the amino electron donor moiety in Formula Pair 11 can form with the linking moiety a julolidene ring. Numerous other fused rings containing the heteroatom of the electron donor moiety are possible. However, while within the contemplation of useful dipole molecular structures, fused ring substituent patterns are not generally preferred, since they increase molecular bulk, thereby reducing the hyperpolarizability density, while lacking in many instances the synthetic convenience of monovalent substituents.

The substituents R and $R^4$ are optionally substituted hydrocarbon substituents in all instances, while the substitutents $R^2$ and $R^3$ can be hydrogen or optionally substituted hydrocarbon substituents, with one or both most preferably being optionally substituted hydrocarbon substituents. Specifically contemplated forms of hydrocarbon substituents are aliphatic hydrocarbon substituents containing from 1 to about 40 (preferably 1 to 10 carbon atoms and optimally 1 to 6) carbon atoms—e.g., alkyl, alkenyl, and alkynyl, including all cyclic forms thereof; aromatic hydrocarbon substituents containing from 6 to 20 carbon atoms (preferably 6 to 10 carbon atoms—i.e., phenyl and naphthyl); and hydrocarbon substituents which are composites of these aliphatic and aromatic substituents—e.g., alkaryl, aralkyl, alkaralkyl, aralkaryl, etc. The aliphatic substituents and substituent moieties can contain unsaturation for steric or synthetic convenience. All of the hydrocarbon substituents can, optionally, themselves be substituted to facilitate polar alignment in the transmission medium.

The hydrocarbon and substituted hydrocarbon substituents of the electron acceptor and donor moieties can be chosen, if desired, to enhance the electron accepting or donating functions of the electron acceptor and donor moieties, respectively. Hammett sigma values of the electron donor and electron acceptor moieties are useful for this purpose, as explained above in connection with the selection of $R^a$ and $R^d$ substituents. For example, the Hammett sigma values of a primary amino group (—NH$_2$); second amino groups, such as alkylamino (e.g., —NHCH$_3$, —NHCH$_2$CH$_3$, and —NH—n—C$_4$H$_9$); and tertiary amino groups, such as dialkylamino (e.g., dimethylamino) range from $-0.04$ for the primary amino group to $-0.83$, with the secondary and tertiary amino groups generally having Hammett sigma values more negative than $-0.20$.

In one specific preferred form of the invention the repeating units containing molecular dipole pendant groups of the linear polymers exhibiting high $\chi^{(2)}$ values can be represented by the Formula Pair 16:

(16)

where
A is a sulfonyl electron acceptor;
E is a 4,4'-stilbene linking moiety;
r is an integer of from 1 to 12;
$R^2$ is hydrogen or a hydrocarbon containing from 1 to 6 carbon atoms; and
$R^1$ is hydrogen or methyl.

The linear polymers containing repeating units with pendant molecular dipoles as described above can, if desired, contain only repeating units with pendant molecular dipoles. The same or different pendant molecular dipoles can be present in the repeating units. In the former instance, the linear polymers are homopolymers.

When all of the repeating units contain a pendant molecular dipole, the highest attainable hyperpolarizability densities should be obtained.

One disadvantage that has been encountered in preparing homopolymers satisfying the requirements of the invention is limited solubility. This is believed to result from a small amount of unwanted addition occurring at the sites of the vinyl moieties in the pendant groups. The homopolymers, despite their stiffness, can be shaped into useful optically active transmission media by hot pressing and poling.

To allow solubility of the linear polymers in common organic solvents (e.g., benzene, chlorobenzene, toluene, dimethylformamide, dimethylsulfoxide, chloroform, dichloromethane, acetonitrile, and acetone) and thus to allow spin casting of the linear polymers, it is preferred to limit the proportion of the repeating units containing vinyl groups to 35 percent or less of the total repeating units. Thus, in one preferred linear polymers contemplated for use in the practice of this invention are those containing from 5 to 35 percent (optimally 20 to 35 percent) repeating units containing molecular dipoles containing vinyl unsaturation (e.g., stilbene molecular dipoles). High $\chi^{(2)}$ values can be achieved, even when the high $\beta$ repeating units constitute only 5 percent of the total repeating units of the linear polymers.

In another preferred form of the invention vinyl groups in the repeating units of the linear polymers are avoided entirely, thereby entirely avoiding the problem of limited solubility. This can be accomplished while still retaining high $\beta$ repeating units by employing pendant molecular dipoles according to the invention which contain a pair of aza groups rather than one or more vinyl groups—e.g., azobenzene ($-C_6H_4-N_2-C_6H_4-$) molecular dipoles.

The remaining repeating units of the linear polymer can be provided by vinyl addition monomers chosen from among a wide variety of conventional forms. In one form the remaining repeating units can also include pendant molecular dipoles. To avoid unwanted addition reactions in the pendant molecular dipoles during polymerization the pendant groups of the remaining repeating units should be free of vinyl moieties. For example, the pendant molecular dipoles in the remaining repeating units can be identical to the high $\beta$ repeating units described above, except that the 4,4'-stilbenoid linking is replaced by a 1,4-phenylene or 4,4'-biphenylene linking moiety.

Any remaining repeating units other than those containing molecular dipole pendant groups can, but need not, contain a pendant group. In one preferred form of the invention the remaining repeating units are chosen from among esters and nitriles of 2-alkenoic acids. Preferred repeating units of this type can be represented by Formula 17:

(17)

where
$R^1$ is as has been previously defined, preferably hydrogen or methyl;
$R^5$ is $-CN$ or $-C(O)OR^6$; and
$R^6$ is an optionally substituted hydrocarbon, preferably alkyl of from 1 to 6 carbon atoms.

Methyl and ethyl acrylates and methacrylates, acrylonitrile, and methacrylonitrile are specifically preferred examples of these repeating units.

Another preferred class of repeating units are those derived from styrenic monomers (monomers of styrene and its derivatives formed by hydrogen displacement—e.g., halo and $R^6$ substituted styrene).

Any one or combination of the repeating units described above can, with the high $\beta$ repeating units, account for all of the repeating units of the linear polymers employed in the optical articles of this invention. However, no repeating units other than the high $\beta$ repeating units are required.

To form the polymers described above it is merely necessary to combine in the proportions desired in the linear polymer vinyl addition monomers corresponding to the repeating units. Polymerization can be induced thermally or by exposure to ultraviolet radiation (UV). For polymerization in the near UV (290 to 390 nm) portion of the spectrum as well as the shorter wavelength (less than 550 nm) regions of the visible spectrum conventional polymerization initiators can be employed. A variety of conventional useful polymerization initiators are listed in Scozzafava et al U.S. Pat. No. 4,485,161 and in *Principles of Polymerization*, 2nd Ed., by G. Odiah, John Wiley & Sons, 1981, pp. 194–206.

The optically active transmission medium need contain nothing in addition to the linear polymer described above. In practice small amounts of polymerization initiators, usually less than 1 percent by weight, based on the weight of polymer, can remain in the polymer when it is formed into the optically active transmission medium. Because of their low concentrations, absorption of radiation by residual initiators are normally too low to be significant. It is also possible, though not usually preferred, to combine the high $\chi^{(2)}$ linear polymers described with other binders, such as optically passive linear polymers, in forming the transmission medium. Other binders can be tolerated to the extent that $\chi^{(2)}$ for the transmission medium remains above $10^{-9}$ esu. Molecular dipoles which are not pendant groups of a polymer can be mixed with the high $\chi^{(2)}$ linear polymers, if desired, but this is not required, since better control of the properties of the transmission medium is achieved when the molecular dipoles are pendant groups of a linear polymer.

To facilitate polar alignment of the molecular dipoles contained within the optically active transmission medium the high $\chi^{(2)}$ linear polymers (and other binders, if present) must exhibit glass transition temperatures above ambient temperatures. To assure that the transmission medium is sufficiently rigid to lock the molecular dipoles in polar alignment under temperatures of use, it is preferred that the high $\chi^{(2)}$ linear polymers exhibit a glass transition temperature in the range of from about 70° C. to 150° C. Linear polymers having still higher glass transition temperatures can be employed, but are not preferred because of the high temperatures required for poling and the resulting potential for thermal degradation of the organic components of the optical transmission medium.

The high $\beta$ linear polymers preferably have molecular weights (weight average, also designated $M_w$) in the range of from about 10,000 to 200,000, optimally from about 15,000 to 120,000. Polymer molecular weights, unless otherwise indicated are understood to be measured by gel permeation chromatography (GPC) using differential refractive index differential and polystyrene standards. A molecular weight determination procedure of this type is described in detail in "Modern Size Exclusion Chromatography", W. W. Yau, J. J. Kirkland, and D. D. Bly, Wiley Interscience, J. Wiley and Sons, 1979.

The specific selection of materials forming the optically active transmission media will be influenced by the wavelengths of electromagnetic radiation the transmission be used to propagate. The preferred optical articles of this invention are those which exhibit the lowest possible absorptions of electromagnetic radiation in the optically active transmission medium. For optical articles which are intended to propagate a single wavelength or range of wavelenths of electromagnetic radiation, transmission media are employed which exhibit absorption minima within the wavelength region of propagation. Where the optical article itself receives electromagnetic radiation of one wavelength and internally produces for transmission electromagnetic radiation of a differing wavelength, the transmission medium is preferably chosen to exhibit minimal absorptions in both spectral regions. For example, if it is intended to employ an optical article according to this invention for second harmonic generation in response to infrared radiation received from a laser, such as a laser emitting in the 800 to 1600 nm region of the spectrum, the linear polymers are chosen to exhibit the lowest levels of absorption possible at the laser wavelength in the infrared and at the wavelength of the second harmonic in the visible spectrum.

EXAMPLES

The invention can be better appreciated by reference to the following specific examples:

EXAMPLE 1

N-(6-Hydroxyhexyl)-N-methylaniline

A mixture of 153 g (1.43 mol) freshly distilled N-methylaniline, 200 g (1.46 mol) 6-chlorohexanol, 200 g (1.45 mol) potassium carbonate, 6 g potassium iodide, and 750 mL n-butanol was heated at reflux under nitrogen with vigorous mechanical stirring for 4 days. The solution was cooled, filtered, and the solvent was removed at reduced pressure. The residue was distilled in vacuo to produce 210 g (71%) of a colorless oil, bp 153°–166° C. (0.10 mm).

$^1$H NMR (300 MHz, CDCl$_3$) δ 1.44 (m, 4H), 1.62 (m, 5H), 2.98 (s, 3H), 3.36 (t, 2H), 3.67 (t, 2H), 6.74 (m, 3H), 7.29 (t, 2H).

EXAMPLE 2

N-(6-Acetoxyhexyl)-N-methylaniline

A mixture of 210 g (1.01 mol) of N-(6-hydroxyhexyl)-N-methylaniline (Example 1), 112 g (1.10 mol) of acetic anhydride, and 86 g (1.1 mol) of pyridine was heated at reflux with stirring for 2 hours. After cooling, the solution was poured onto 500 g of ice and extracted with ethyl acetate (4×300 mL). The combined extracts were dried (MgSO$_4$) and the solvent was removed at reduced pressure. The residue was distilled in vacuo, collecting the fraction boiling at 130° C. (0.01 mm). Yield: 231 g (93%) of a colorless oil.

$^1$H NMR (300 MHz, CDCl$_3$) δ 1.40 (m, 4H), 1.65 (m, 4H), 2.08 (s, 3H), 2.96 (s, 3H), 3.37 (t, 2H), 4.07 (t, 2H), 6.75 (m, 3H), 7.23 (t, 2H).

EXAMPLE 3

4-[(6-Acetoxyhexyl)methylamino]benzaldehyde

Phosphorous oxychloride (145 g, 0.95 mol) was added dropwise at 5° C. to 280 mL of stirred N,N-dimethylformamide (DMF), and the mixture was stirred at 5° C. for 2 hours. N-(6-Acetoxyhexyl)-N-methylaniline (Example 2, 230 g, 0.93 mol) was added slowly, and the reaction mixture was heated at 90° C. for 3 hours. After cooling, the solution was poured onto 500 g of ice and the resulting mixture was neutralized to pH 5 with sodium acetate. The mixture was extracted with dichloromethane (4×200 mL), the combined extracts were dried (MgSO$_4$), and the solvent was removed at reduced pressure. The brown residue was distilled in vacuo to provide 186 g (73%) of a yellow oil, bp 195° C. (0.15 mm).

$^1$H NMR (300 MHz, CDCl$_3$) δ 1.38 (m, 4H), 1.60 (m, 4H), 2.02 (s, 3H), 2.98 (s, 3H), 3.37 (t, 2H), 4.02 (t, 2H), 6.65 (d, 2H), 7.66 (d, 2H), 9.70 (s, 1H).

EXAMPLE 4

4-Methylmercaptobenzyl chloride

To a stirred solution of 154 g (1.0 mol) of 4-methylmercaptobenzyl alcohol in 1 liter of dry benzene was added dropwise 80 mL (1.1 mol) of thionyl chloride. The mixture immediately turned blue. After the addition of the thionyl chloride was completed, the mixture was heated at reflux for 2 hours. After cooling, the benzene and excess thionyl chloride were distilled at ambient pressure. The product was distilled in vacuo at 105° C. (0.5 mm), to yield 160 g (93%) of a colorless liquid.

$^1$NMR (300 MHz, CDCl$_3$) δ 2.49 (s, 3H), 4.57 (s, 2H), 7.28 (dd, 4H).

EXAMPLE 5

Diethyl 4-Methylmercaptobenzylphosphonate

4-Methylmercaptobenzyl chloride (Example 4, 160 g, 0.94 mol) was added dropwise, under nitrogen, with stirring to 183 g (1.1 mol) of triethylphosphite which was heated at reflux. When the addition of the 4-methylmercaptobenzyl chloride was completed, the mixture was refluxed for additional 4 hours. The product was distilled in vacuo to yield 229 g (89%) of a colorless, viscous oil bp 142°–145° C. (0.025 mm).

$^1$H NMR (300 MHz, CDCl$_3$, δ): 1.27 (t, 6H), 2.49 (s, 3H), 3.13 (d, 2H), 4.04 (quintet, 4H), 7.66 (dd, 4H).

EXAMPLE 6

Diethyl 4-Methylsulfonylbenzylphosphonate

To a stirred solution of 174 g (0.60 mol) of diethyl 4-methylmercaptobenzylphosphonate (Example 5) in 500 mL of glacial acetic acid was added dropwise 171 g (1.5 mol) of hydrogen peroxide (30% in water). The mixture was heated at reflux for 2 hours. After cooling, the water and acetic acid were removed under reduced pressure and the residue was distilled to yield 121 g (66%) of very viscous liquid bp 214°–216° C. ($2\times10^{-4}$ mm).

$^1$H NMR (300 MHz, CDCl$_3$) δ 1.23 (t, 6H), 3.01 (s, 3H), 3.19 (d, 2H), 4.02 (quintet, 4H), 7.66 (dd, 4H).

EXAMPLE 7

4'-[(6-Hydroxyhexyl)methylamino]-4-methylsulfonylstilbene

To a solution of 5 g (0.125 mol) 60% sodium hydride dispersion, 27.7 g (0.1 mol) of 4-[(6-acetoxyhexyl)methylamino]benzaldehyde (Example 3) and 200 mL of dry, freshly distilled 1,2-dimethoxyethane (DME) under nitrogen, at room temperature, with vigorous stirring was added 30.6 g (0.1 mol) of diethyl 4-methylsulfonylbenzylphosphonate (Example 6). The mixture immediately turned yellow. The reaction mixture was heated at reflux for 2 hours. The bright yellow solution was poured over 400 g of crushed ice under a nitrogen blanket and the resulting mixture was extracted with four 250 mL portions of dichloromethane. The combined organic extracts were washed three times with 250 mL of water, and the solvent was removed at reduced pressure. The residue was dissolved in 250 mL of 10% (v/v) HCl in 1:1 ethanol:water and the solution was heated at reflux for 4 hours. After cooling the solution was neutralized to pH 7 by the slow and careful addition of sodium carbonate. The yellow solid thus formed was collected by filtration, washed with water and air dried. Recrystallization from methanol yielded 31.4 g (81%) of a bright yellow solid. This material contained some acetate which was not hydrolyzed ($\simeq$5%), however, a pure sample of the material was obtained by chromatography. Thus, 5 g of the material was dissolved in 25 mL of a mixture of acetone:ethylacetate 1:5, and loaded onto a dry silica gel column (500 g, 5 cm diameter). Elution gave 4.5 g of pure material which was then recrystallized from absolute methanol. mp 113°–115° C.

$^1$H NMR (300 MHz, CDCl$_3$) δ 1.45 (m, 4H), 1.63 (m, 4H), 3.01 (s, 3H), 3.09 (s, 3H), 3.39 (t, 2H), 3.69 (br t, 2H), 6.67 (d, 2H), 6.89 (d, 1H), 7.18 (d, 1H), 7.41 (d, 2H), 7.60 (d, 2H), 7.87 (d, 2H).

EXAMPLE 8

4'-[(6-Hydroxyhexyl)methylamino]-4-methylsulfonylazobenzene

A stirred suspension of 150 g (0.88 mol) of 4-methylsulfonylaniline in 1 liter of 20% hydrochloric acid at 0°–3° C. was treated dropwise with a solution of 66.5 g (0.96 mol) of sodium nitrite in 200 mL of water. N-(6-Hydroxyhexyl)-N-methylaniline (Example 1, 218 g, 1.05 mol) was added slowly, maintaining the temperature below 5° C., and the mixture was stirred for 1 hour. Sodium acetate (119 g, 0.88 mol) was added and stirring was continued for 3 hours. Concentrated ammonium hydroxide (250 mL) was added, and the mixture was stirred for 64 hours. The precipitated product was recrystallized successively from ethanol, from toluene, and then from toluene/isopropanol to produce 160 g (47%) of a red solid, mp 114°–116° C.

$^1$H NMR (300 MHz, CDCl$_3$) δ 1.4 (m, 4H), 1.6 (m, 4H), 3.07 (s, 3H), 3.08 (s, 3H), 3.43 (t, 2H), 3.64 (t, 2H), 6.72 (d, 2H), 7.88 (d, 2H), 7.98 (AB, 4H). $^{13}$C{$^1$H} NMR (75.5 MHz, CDCl$_3$) δ 25.7, 26.8, 27.1, 38.7, 44.6, 52.6, 62.7, 111.3, 122.7, 126.0, 128.4, 139.7, 143.4, 152.4, 156.5.

EXAMPLE 9

4'-[(6-acryloyloxyhexyl)methylamino]-4-methylsulfonylstilbene

A stirred mixture of 4'-[(6-hydroxyhexyl)methylamino]-4-methylsulfonylstilbene (Example 7, 20.0 g, 52 mmol), triethylamine (6.3 g, 62 mmol) and dry dichloromethane (DCM) was treated dropwise with acryloyl chloride (5.6 g, 62 mmol) in 50 mL of DCM at 23° C. under nitrogen. The resulting solution was stirred at 23° C. for 72 hours, and then filtered. The filtrate was washed successively with saturated NaCl, with saturated NHCO$_3$, and with water. The organic layer was dried (MgSO$_4$), and the solvent was removed at reduced pressure to deposit a yellow oil which gradually crystallized. The product was recrystallized from tetrahydrofuran (THF)/hexanes to yield 15.5 g (68%) of a yellow solid, mp 88°–90° C.

$^1$H NMR (300 MHz, CDCl$_3$) δ 1.40 (m, 4H), 1.70 (m, 4H), 3.00 (s, 3H), 3.06 (s, 3H), 3.37 (t, 2H), 4.17 (t, 2H), 5.82 (dd, 1H), 6.12 (m, 1H), 6.40 (dd, 1H), 6.70 (d, 2H), 6.91 (d, 1H), 7.09 (d, 1H), 7.44 (d, 1H), 7.62 (d, 2H), 7.88 (d, 2H). $^{13}$C{$^1$H} NMR (75.5 MHz, CDCl$_3$) δ 25.8, 26.7, 28.6, 44.6, 64.4, 121.4, 126.3, 127.2, 127.7, 128.3, 128.6, 129.5, 130.2, 130.4, 148.4. Anal. Calcd for C$_{25}$H$_{31}$N$_3$O$_4$S: C, 68.00; H, 7.08; N, 3.17; S, 7.26. Found: C, 68.01; H, 6.86; N, 2.98; S, 6.89.

EXAMPLE 10

4'-[(6-Methacryloyloxyhexyl)methylamino]-4-methylsulfonylazobenzene

A mixture of 141 g (0.362 mol) of 4'-[(6-hydroxyhexyl)methylamino]-4-methylsulfonylazobenzene (Example 8), 37.0 g (0.366 mol) of triethylamine, 400 mg of 3-t-butyl-4-hydroxy-5-methylphenylsulfide (inhibitor), and 500 mL of dry dichloromethane was treated with methacryloyl chloride (52.7 g, 0.504 mol) at 0° C. under nitrogen. The reaction mixture was stirred for 1 hour at 0° C. and then for 12 hours at 23° C. The reaction mixture was washed with 500 mL of water to remove precipitated triethylamine hydrochloride, then with 500 mL of saturated NHCO$_3$, and finally with 500 mL of water. The organic layer was dried (Na$_2$SO$_4$) and the solvent was removed at reduced pressure to deposit a dark orange oil which crystallized on trituration with hexanes. The product was recrystallized from toluene and then from THF/hexanes to provide 124 g (75%) of orange powder, mp 78°–80° C.

$^1$H NMR (300 MHz, CDCl$_3$) δ 1.44 (m, 4H), 1.69 (m, 4H), 1.95 (s, 3H), 3.09 (s, 6H), 3.45 (t, 2H), 4.16 (t, 2H), 5.56 (s, 1H), 6.10 (s, 1H), 6.74 (d, 2H), 7.90 (d, 2H), 8.00 (AB, 4H). $^{13}$C{$^1$H} NMR (75.5 MHz, CDCl$_3$) δ 18.3, 25.9, 26.7, 27.0, 28.6, 38.7, 44.6, 52.5, 64.5, 111.3, 122.7, 125.1, 126.0, 128.3, 136.5, 139.8, 143.5, 152.4, 156.4, 167.4. FD-MS: 457 (M+). Anal. Calcd for C$_{24}$H$_{31}$N$_3$O$_4$S: C, 63.00; H, 6.83; N, 9.12; S, 7.01. Found: C, 62.96; H, 6.56; N, 9.12; S, 7.83.

EXAMPLE 11

Copolymerization of 4'-[(6-acryloxyoxyhexyl)methlamino]-4-methylsulfonylstilbene with methylmethacrylate A mixture of 4'-[(6-acryloyloxyhexyl)methylamino]-4-methylsulfonylstilbene (Example 9, 0.75 g, 1.7 mmol), distilled methylmethacrylate (2.00 g, 20.0 mmol), distilled chlorobenzene (15 mL), and 2,2-azobis-(2-methylpropionitrile) (AIBN, 38 mg) was degassed by standard freeze/thaw techniques and heated in a sealed ampoule under nitrogen at 60° C. for 48 hours. The resulting viscous solution was cooled and poured into 100 mL of vigorously agitated methanol to precipitate the polymer as a fine yellow powder, which was isolated by centrifugation. The polymer was purified by repeated reprecipitation from dichloromethane into methanol, and was dried in vacuo at 80° C. for 48 hours. Yield: 2.35 g (80%).

GPC (THF, polystyrene standards, differential refractive index detection): $\overline{M_n}=25{,}300$ $\overline{M_w}=111{,}000$. $T_g=109°$ C. (DSC).

EXAMPLE 12

Copolymerization of 4'-[(6-acryloyloxyhexyl)methylamino]-4-methylsulfonylstilbene with 4-t-butylstyrene A solution of 4'-[acryloyloxyhexyl)methylamino]-4-methylsulfonylstilbene (Example 9, 5.00 g, 11.3 mmol), distilled 4-t-butylstyrene (15.0 g, 93.6 mmol), and AIBN (0.182 g, 1.1 mmol) in 100 mL of distilled chlorobenzene was degassed by standard freeze/thaw techniques and then was heated at 60° C. for 15 hours. The polymer was precipitated into 1500 mL of vigorously stirred methanol and purified by reprecipitation from dichloromethane into methanol. A yellow powder was obtained, mass 10.0 g (50%).

GPC (THF, polystyrene standards, differential refractive index detection): $\overline{M_n}=39{,}500$; $\overline{M_w}=166{,}000$. $T_g=127°$ C. (DSC).

EXAMPLE 13

Homopolymerization of 4'-[(6-acryloyloxyhexyl)methylamino]-4-methylsulfonylstilbene A solution of 4'-[(6-acryloyloxyhexyl)methylamino]-4-methylsulfonylstilbene (Example 9, 2.29 g, 5.00 mmol), and AIBN (0.042 g, 0.26 mmol) in 10 mL of distilled chlorobenzene was degassed by standard freeze/thaw techniques and then was heated at 60° C. for 48 hours. The polymer was precipitated into 300 mL of vigorously stirred methanol and purified by reprecipitation from dichloromethane into methanol. An orange powder was obtained, mass 2.09 g (90%).

GPC (THF, polystyrene standards, differential refractive index detection): $\overline{M_n}=22{,}100$; $\overline{M_w}=56{,}500$. $T_g=101°$ C. (DSC).

EXAMPLE 14

Copolymerization of 4'-[(6-acryloyloxyhexyl)methylamino]-4-methylsulfonylazobenzene with methylmethacrylate A stirred solution of 75.0 g (0.164 mol) of 4'-[(6-methacryloyloxyhexyl)methylamino]-4-methylsulfonylazobenzene (Example 10), 75.0 g (0.749 mol) of distilled methylmethacrylate, and 2.50 g (0.0091 mol) of AIBN in 500 mL of distilled chlorobenzene was degassed by bubbling nitrogen through the mixture. The solution was heated at 60° C. for 48 hours and then poured into excess methanol (agitated in a blender) to precipitate the polymer. The product was reprecipitated from dichloromethane into methanol and then from THF into deionized water. After drying to constant weight in vacuo, 141 g (94%) of an orange powder was obtained.

GPC (THF, polystyrene standards, differential refractive index detection): $\overline{M_n}=33{,}600$; $\overline{M_w}=92{,}000$. $T_g=109°$ C. (DSC).

EXAMPLE 15

Optical Cell Preparation for Copolymer 4'-[(6-acryloyloxyhexyl)methlamino]-4-methylsulfonylstilbene with methylmethacrylate (Example 11)

The polymer (0.35 g) was dissolved in 2 mL of dichloromethane and spin coated at 250 rpm onto 125 μm gap side-by-side chromium electrodes by first saturating the surfaces before spinning. The samples were dried for 16 hours at 40° C., producing an optically clear, amorphous film. The film was oriented by heating to 125° C. and applying a poling field of $2.4\times10^4$ V/cm across the chromium electrodes. The sample was cooled to room temperature and the field was removed.

EXAMPLE 16

Optical Cell Preparation for Copolymer 4'-[(6-acryloylhexyl)methylamino]-4-methylsulfonylazobenzene with methylmethacrylate (Example 14)

Soda lime glass overed on one side with 25 nm of indium tin oxide (ITO) was obtained commercially. A $SiO_2$ film 0.2 μm thick was sputtered onto the side of the soda lime glass covered with ITO. Next, a polymer film was spin coated over the $SiO_2$ layer as follows: The polymer (10 wt %) was dissolved in purified 1,2,3-trichloropropane. The soluton was dropped onto the substrate until the substrate was completely covered. The substrate was spun at 500 rpm for 10 seconds and then the speed was increased to 2000 rpm for 60 sec. The film was subsequently placed in a vacuum oven and heated to 120° C. for about 12 hr. in order to remove residual solvent. This treatment resulted in a film approximately 1.25 μm thick. Next, a 1 μm monomeric glass film was thermally evaporated over the polyer. Finally, a 200 nm thick MgIn electrode was thermally evaporated on top of the monomer glass.

The polymer film was poled by applying 430 volts across the ITO and MgIn electrodes (ITO positive) for 5 minutes while the film was at a temperature of 111° C. With the voltage still applied, the film was then slowly cooled to room temperature.

EXAMPLE 17

Second Harmonic Generation from Polymer 4'-[(6-acryloyloxyhexyl)methlamino]-4-methylsulfonylstilbene with methylmethacrylate (Example 11)

The film of polymer 4'-[(6-acryloyloxyhexyl)methlamino]-4-methylsulfonylstilbene with methylmethacrylate (Example 11) prepared as described in Example 15 was probed with 1064 nm laser light and a second harmonic signal at 532 nm was detected which was not present in the unpoled material. The signal intensity was found to be proportional to the square of the poling field strength. The signal intensity was referenced to that of a quartz crystal, giving a value for the second order susceptibility:

$$\chi^{(2)}_{zzz} \approx 1\times10^{-9} \text{ esu}.$$

The ratio between the two susceptibilities $\chi_{zzz}/\chi_{xxx}$ was measured to be 2.9, very close to the theoretical value of 3.0. The second harmonic signal was completely stable for 24 hours.

EXAMPLE 18

Second Harmonic Generation from Polymer 4'-[(6-acryloyloxyhexyl)methylamino]-4-methylsulfonylazobenzene with methylmethacrylate (Example 14)

The film of polymer 4'-[(6-acryloyloxyhexyl)methylamino]-4-methylsulfonylazobenzene with methyl methacrylate (Example 14) prepared as described in Example 16 was probed with 1064 nm laser light and a second harmonic signal at 532 nm was detected which was not present in the unpoled sample nor in a previously poled sample heated above the glass transition temperature of the polymer. The signal intensity was found to be proportional to the square of the poling field strength. The ratio between the two susceptibilities $\chi_{zzz}/\chi_{xxx}$ was measured as 3.0, in accordance with theory.

EXAMPLE 19

Electrooptic Measurements on Polymer 4'-[(6-acryloyloxyhexyl)methylamino]-4-methylsulfonylazobenzene with methyl methacrylate (Example 14)

The electro-optic effect of the polymer containing multilayer structure of Example 16 was observed using an ellipsometer. An ellipsometer is an optic instrument which measures the relative amplitude and phase change of light polarized in and normal to the plane of incidence upon reflection from a surface. Using Fresnel's equations, the electro-optic response of the multilayer structure was modeled to obtain the second order polarization susceptibility of the polymer film. A second order polarization susceptibility ($\chi^2$) of $2 \times 10^{-7}$ esu results in a curve which closely fits the measured response.

The invention has been described in detail with particular reference to preferred embodiments thereof, but it will be understood that variations and modifications can be effected within the spirit and scope of the invention.

What is claimed is:

1. An optical article containing, for the transmission of electromagnetic radiation, a medium exhibiting a second order polarization susceptibility greater than $10^{-9}$ electrostatic units comprised of a linear polymer containing as pendant groups polar aligned noncentrosymmetric molecular dipoles having an electron donor moiety linked through a conjugated $\pi$ bonding system to an electron acceptor moiety to permit oscillation of the molecular dipoles between a ground state exhibiting a first dipole moment and an excited state exhibiting a differing dipole moment,
characterized in that
the linear polymer contains repeating units derived from vinyl addition polymerization,
at least 5 percent of the repeating units incorporate the molecular dipoles as pendant groups, and
the molecular dipoles include a sulfonyl electron acceptor moiety.

2. An optical article according to claim 1 further characterized in that means are provided for directing electromagnetic radiation to said medium.

3. An optical article according to claim 1 further characterized in that biasing means are provided for placing an electric field across said medium.

4. An optical article according to claim 3 further characterized in that said biasing means includes at least one transparent electrode in contact with said medium.

5. An optical article according to claim 1 further characterized in that said medium lies in contact with a linear waveguide for electromagnetic radiation.

6. An optical article according to claim 1 further characterized in that said medium exhibits a $\chi^{(2)}$ of at least $10^{-8}$ electrostatic units.

7. An optical article according to claim 1 further characterized in that the linear polymer is a homopolymer.

8. An optical article according to claim 1 further characterized in that the repeating units incorporating the molecular dipoles form from 5 to 35 percent of the repeating units of the linear polymer.

9. An optical article according to claim 1 further characterized in that the linear polymer exhibits a molecular weight in the range of from 10,000 to 200,000 on a weight average basis.

10. An optical article according to claim 9 further characterized in that the linear polymer exhibits a molecular weight in the range of from 15,000 to 120,000 on a weight average basis.

11. An optical article according to claim 1 further characterized in that the molecular dipoles include an electron donor moiety linked to the sulfonyl electron acceptor moiety through a conjugated $\pi$ bonding system consisting of two terminal carbocyclic aromatic rings linked through 1 to 3 vinyl groups or two aza groups.

12. An optical article according to claim 11 further characterized in that the molecular dipoles are represented by the formula:

where
A is a sulfonyl electron acceptor moiety;
D is an electron donor moiety;
E is a stilbenoid conjugated $\pi$ bonding system; and
L is a flexible spacer moiety.

13. An optical article according to claim 12 further characterized in that D is a secondary or tertiary amino moiety.

14. An optical article according to claim 12 further characterized in that A is:

where
R is L or an optionally substituted hydrocarbon moiety.

15. An optical article according to claim 12 further characterized in that the molecular dipoles are represented by the formula:

where
A is a sulfonyl electron acceptor moiety;
D is an electron donor amino moiety;
L is a flexible spacer moiety;
$R^a$ represent hydrogen, subsituents which, together with the electron acceptor moiety, collectively enhance electron acceptance of the phenyl ring to which they are attached, or, optionally in one occurrence, represent a bonding site for L;

$R^d$ represent hydrogen, subsituents which, together with the electron donor amino moiety, collectively enhance the electron acceptance of the phenyl ring to which they are attached, or, optionally in one occurrence, represent a bonding site for L;
G is independently in each occurrence a methine or aza moiety, with the proviso that no more than two aza moieties are next adjacent; and
n is an integer of from 1 to 3.

16. An optical article according to claim 1 further characterized in that the linear polymer contains repeating units derived from the vinyl addition polymerization of a styrenic monomer.

17. An optical article according to claim 1 further characterized in that the linear polymer contains repeating units derived from the vinyl addition polymerization of 2-alkenoate esters.

18. An optical article according to claim 17 further characterized in that the repeating units containing the molecular dipoles are represented by the formula:

where
A is a sulfonyl electron acceptor;
$E^1$ is a 4,4'-stilbene linking moiety;
r is an integer of from 1 to 12;
$R^1$ is hydrogen or methyl; and
$R^2$ is hydrogen or a hydrocarbon containing from 1 to 6 carbon atoms.

19. An optical article according to claim 18 further characterized in that remaining repeating units of the linear polymer are represented by the formula:

where
$R^1$ is hydrogen or methyl;
$R^5$ is —CN or —C(O)O$R^6$; and
$R^6$ is alkyl of from 1 to 6 carbon atoms.

20. An optical article according to claim 18 further characterized in that remaining repeating units of the linear polymer are derived from styrenic monomers.

* * * * *